US008331275B2

(12) United States Patent
Sarikaya et al.

(10) Patent No.: US 8,331,275 B2
(45) Date of Patent: Dec. 11, 2012

(54) APPARATUS AND METHOD FOR PROXYING POWERED OFF INTERFACES USING THE ACTIVE INTERFACE

(75) Inventors: Behcet Sarikaya, Wylie, TX (US); Yangsong Xia, Nanjing (CN); H. Anthony Chan, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 318 days.

(21) Appl. No.: 12/645,131

(22) Filed: Dec. 22, 2009

(65) Prior Publication Data

US 2010/0157866 A1 Jun. 24, 2010

Related U.S. Application Data

(60) Provisional application No. 61/139,989, filed on Dec. 22, 2008.

(51) Int. Cl.
*G08C 17/00* (2006.01)
*H04W 4/00* (2009.01)
*H04J 3/16* (2006.01)
*H04J 3/22* (2006.01)
(52) U.S. Cl. .................. 370/311; 370/328; 370/465
(58) Field of Classification Search .............. 370/311, 370/328, 465
See application file for complete search history.

(56) References Cited

U.S. PATENT DOCUMENTS

| | | | |
|---|---|---|---|
| 2006/0259598 A1 | 11/2006 | Kim et al. | |
| 2008/0304454 A1* | 12/2008 | Zhong et al. | 370/331 |
| 2008/0305799 A1 | 12/2008 | Zuniga et al. | |
| 2009/0046656 A1* | 2/2009 | Kitazoe et al. | 370/331 |
| 2009/0046657 A1* | 2/2009 | Kim et al. | 370/331 |
| 2009/0059829 A1* | 3/2009 | Bachmann et al. | 370/311 |
| 2009/0154421 A1* | 6/2009 | Hong et al. | 370/331 |

FOREIGN PATENT DOCUMENTS

| | | | |
|---|---|---|---|
| EP | 1578095 A1 | 9/2005 | |
| EP | 1841142 A1 | 10/2007 | |
| EP | 1959621 A1 | 8/2008 | |

OTHER PUBLICATIONS

"Draft Standard for Local and Metropolitan Area Networks: Media Independent Handover Services," IEEE P802.21/D14; IEEE Computer Society, Sep. 2008.

(Continued)

*Primary Examiner* — Ronald Abelson
(74) *Attorney, Agent, or Firm* — Conley Rose, P.C.; Grant Rodolph; Brandt Howell

(57) ABSTRACT

An apparatus comprising a mobile node (MN) comprising a first radio interface and at least one second radio interface, wherein a point of service (PoS) is configured to communicate with the MN via the first radio interface to proxy the second interface, and wherein the first interface is an active interface and the second interface is a powered off interface. Also included is an apparatus comprising at least one processor configured to implement a method comprising setting an interface between a MN and a network in a powered off mode, tracking the mobility of the MN on behalf of the network when the interface is powered off, and waking up the interface when a call arrives in the network for the interface.

20 Claims, 8 Drawing Sheets

OTHER PUBLICATIONS

"3rd Generation Partnership Project: Technical Specification Group Core Network and Terminals: 3GPP System Architecture Evolution; CT WG1 Aspects (Release 8)," 3GPP TR 24.801 v8.1.0 (Dec. 2008).
"3rd Generation Partnership Project: Technical Specification Group Core Network and Terminals; Non-Access-Stratum (NAS) Protocol for Evolved Packet System (EPS); Stage 3, Release 9," 3GPP TS 24.301 v9.0.0 (Sep. 2009).
"WiMAX Forum Network Architecture (Stage 3: Detailed Protocols and Procedures)," Release 1, Version 1.2, Jan. 11, 2008.

Foreign communication from a counterpart application—PCT application PCT/US2009/069268; International Search Report, dated Jun. 10, 2010, 9 pages.
Foreign communication from a counterpart application—PCT application PCT/US2009/069268; Written Opinion, dated Jun. 10, 2010, 11 pages.

* cited by examiner

APPARATUS AND METHOD FOR PROXYING POWERED OFF INTERFACES USING THE ACTIVE INTERFACE

CROSS-REFERENCE TO RELATED APPLICATIONS

The present application claims priority to U.S. Provisional Patent Application 61/139,989, filed Dec. 22, 2008 by Behcet Sarikaya, et al. and entitled "Proxying Powered Off Interfaces Using the Active Interface," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In wireless communication systems, some wireless devices can have multiple radio interfaces, for example based on different wireless technologies or standards. Energy consumption of each radio interface can depend on its radio state, e.g. transmitting and receiving states, and/or on its operational mode, e.g. as active, idle, and off modes. For example, in the active mode, more energy may be consumed when transmitting data than when receiving data. Further, in the idle mode, the consumed energy is lower than in the active mode. Typically, a multi-radio interface device consumes battery power continuously, since any of its radio interfaces may be transmitting data, receiving data, or in idle mode, where some energy is still consumed. In some wireless technologies, energy consumption of multi-radio devices may be further reduced by switching the radio interface, e.g. in idle mode, to a sleep or deep sleep state or by powering off the radio interface. The radio interface can be powered off only if it's not in use, such as in idle mode. However, in some cases, the radio interface needs to remain alert and cannot be powered off in idle mode, e.g. when a paging channel needs to remain active to wake up the radio interface upon a call arrival.

SUMMARY

In one embodiment, the disclosure includes an apparatus comprising a mobile node (MN) comprising a first radio interface and at least one second radio interface, wherein a point of service (PoS) is configured to communicate with the MN via the first radio interface to proxy the second interface, and wherein the first interface is an active interface and the second interface is a powered off interface.

In another embodiment, the disclosure includes an apparatus comprising at least one processor configured to implement a method comprising setting an interface between a MN and a network in a powered off mode, tracking the mobility of the MN on behalf of the network when the interface is powered off, and waking up the interface when a call arrives in the network for the interface.

In yet another embodiment, the disclosure includes a method comprising proxying an interface in a powered off mode for a MN on behalf of a network using a Media Independent Handover (MIH) protocol between the MN, the network, and a proxy entity.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method to proxy a first radio interface between the device and a first network. The first radio interface may be in idle mode and powered off to reduce energy consumption of the device. The first radio interface may be proxied by a proxy entity in a second network. The proxy entity may communicate with the device via a second radio interface, which may be active, and may manage the first powered off interface on behalf of the first network. When a call arrives for the powered off first radio interface, the proxy entity may receive a paging message on behalf of the device and wake up the powered off first interface via the active second radio interface. The proxy entity may also manage the mobility of the device for the first radio interface and its location update.

Figure 1:
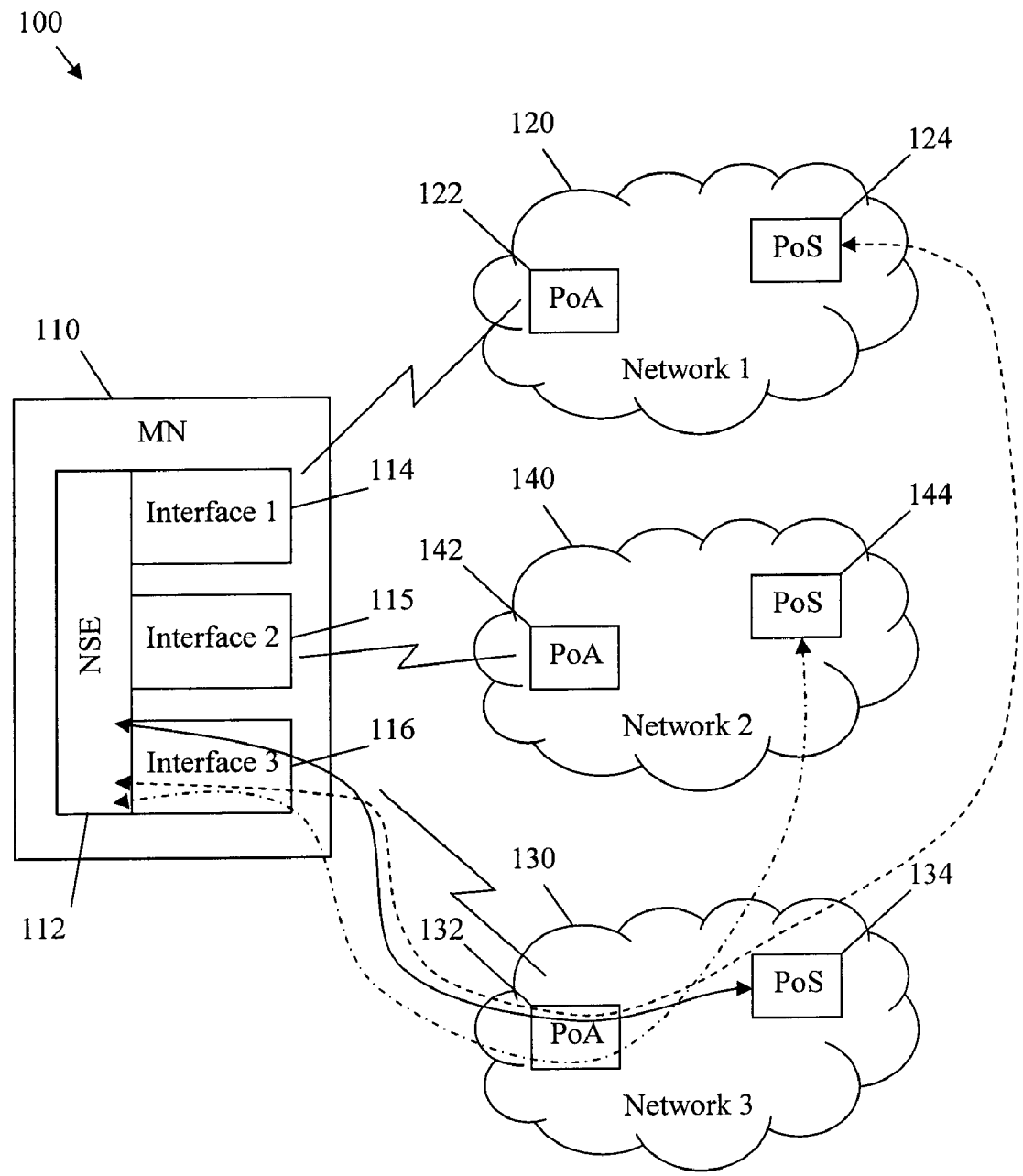
FIG. 1 is a schematic diagram of an embodiment of a multi-radio interface system.

FIG. 1 illustrates one embodiment of a multi-radio interface system 100, which may be used to proxy a radio interface of a wireless device. Proxying the radio interface may support different communication scenarios, such as handling paging, mobility, tracking, and/or other scenarios for the radio interface. Proxying the radio interface may also allow provisioning of necessary network resources for managing the radio interface. The multi-radio interface system 100 may comprise a wireless device 110, at least one proxied network 120, 140, and a proxy network 130. The proxied networks 120, 140 and the proxy network 130 may communicate with the wireless device 110 using different technologies, which may be wireless technologies.

The wireless device 110 may be any user mobile device, component, or apparatus that communicates with the proxied networks 120, 140 and the proxy network 130. The wireless device 110 may be a MN, such as a mobile phone, a personal digital assistant (PDA), a portable computer, or any other wireless device. The wireless device 110 may comprise a network selection entity (NSE) 112, at least one proxied interface 114, 115 and a proxy interface 116. The wireless device 110 may also comprise a power supply, such as a battery (not shown). The proxied interfaces 114, 115 and the proxy interface 116 may be different wireless radio interfaces that enable communications with different wireless networks using different wireless technologies. For example, the proxied interfaces 114, 115 and the proxy interface 116 may comprise radio frequency (RF) transceivers, infrared transceivers, and/or any other wireless communication systems that enable the wireless device 110 to communicate wirelessly with the proxied networks 120, 140 and the proxy network 130. In an embodiment, the proxy interface 116 may remain active and may be used to communicate with the proxy network 130. At least one of the proxied interfaces 114, 115 may be initially powered off (e.g. in idle mode) to conserve energy (e.g. battery power) but may be powered on to communicate with the proxied networks 120, 140.

The NSE 112 may be configured to determine which network(s) from the proxied networks 120, 140 and the proxy network 130 the MN 110 may connect to, for instance based on a policy in the MN 110. Accordingly, the MN 110 may establish a handover with the selected network. The NSE 112 may exchange signals or messages with the proxy network 130 via the proxy interface 116 to manage the proxied interfaces 114, 115. For instance, the NSE 112 may communicate with the proxy network 130 using MIH messages to establish a handover procedure.

The proxied network 120 may be a wireless network and may comprise a first point of access (PoA) 122 and a proxied point of service (PoS) 124. Similarly, the proxied network 140 may be a wireless network and may comprise a first PoA 142 and a proxied PoS 144. The first PoAs 122, 142 may be an access or communication node, which may be configured to establish communications with the wireless device 110 via the proxied interfaces 114, 115. For instance, the first PoAs 122, 142 may comprise a radio tower, a RF transceiver, infrared transceiver, and/or any other wireless communication systems. The proxied PoSs 124, 144 may be a service node configured to provide services for the wireless device 110 and/or network resources for the proxied interfaces 114, 115. For instance, the proxied PoSs 124, 144 may support some communication scenarios for the proxied interfaces 114, 115, e.g. handle network attachments, authentication, and setting up radio bearers.

The proxy network 130 may be a wireless network that may be different than the proxied networks 120, 140. The proxy network 130 may comprise a second PoA 132 and a proxy PoS 134. The second PoA 132 may be an access or communication node, which may be configured to establish communications with the wireless device 110 via the proxy interface 116. The second PoA 132 may comprise a radio tower, a RF transceiver, infrared transceiver, and/or any other wireless communication systems. The proxy PoS 134 may be a service node configured to provide services for the wireless device 110 via the proxy interface 116 and manage the proxy interface 116. The proxy PoS 134 may also be configured to manage the proxied interfaces 114, 115 on behalf of the corresponding proxied networks 120, 140 (or PoSs 124, 144). The proxy PoS 134 may support some communication scenarios for the proxied interfaces 114, 115, e.g. paging, switching to idle mode, waking up, mobility management, and location update. Some of the communication scenarios that may be handled by the proxy PoS 134 to support the proxied interfaces 114, 115 are described in detail below.

For example, the proxy PoS 134 may manage the proxy interface 116 when the proxy interface 116 is in active mode and at least one of the proxied interfaces 114, 115 is in idle mode and powered off. When the proxied interface 114, 115 is powered off and a call for the wireless device 110 arrives in the proxied network 120, 140, the proxied PoS 124, 144 may signal or page the proxy PoS 134 instead of the wireless device 110. The proxy PoS 134 may then signal the NSE 112 in the wireless device 110 via the proxy interface 116 to wake up (e.g. to power on) the proxied interface 114, 115. Hence, the wireless device 110 may receive the call from the proxied network 120, 140 via the now activated proxied interface 114, 115.

In an embodiment, the multi-radio interface system 100 may comprise two proxied networks 120, 140 that include a broadband wireless metropolitan area networks (MAN) based on IEEE 802.16 standard (also referred as a WiMAX network) and a long term evolution (LTE) network, both of which are incorporated herein by reference. Accordingly, the corresponding proxy interfaces 114, 115 may comprise an 802.16 radio interface and a LTE radio interface. For example, the LTE radio interface may be a fourth generation (4G) interface for Global System for Mobile communications (GSM) or Third Generation Partnership Project (3GPP) network. Additionally, the proxy network 130 may be a wireless local area network (WLAN) based on the Institute of Electrical and Electronics Engineers (IEEE) standard 802.11, also referred to as a WiFi network, which is incorporated herein by reference. Accordingly, the proxy interface 116 may be an 802.11 radio interface.

In the IEEE 802.16 or WiMAX network, the proxied PoS 124 may communicate with a paging controller that manages the services and/or resources of the IEEE 802.16 radio interface when the interface is not active. When a call arrives on the network, the proxied PoS 124 may send a paging message to the proxy PoS 134 in the WiFi network, which may then communicate with the NSE 112 of the wireless device 110 to wake up the IEEE 802.16 radio interface. In the LTE network, the proxied PoS 144 may communicate with a Mobility Management Entity (MME) at a control plane, e.g. using a non-access stratum (NAS) protocol. The MME may manage the services and/or resources of the LTE radio interface when the interface is not active. When a call arrives on the network, the proxied PoS 144 may send a paging message to the proxy PoS 134, which may then communicate with the NSE 112 to wake up the LTE radio interface.

Figure 2:
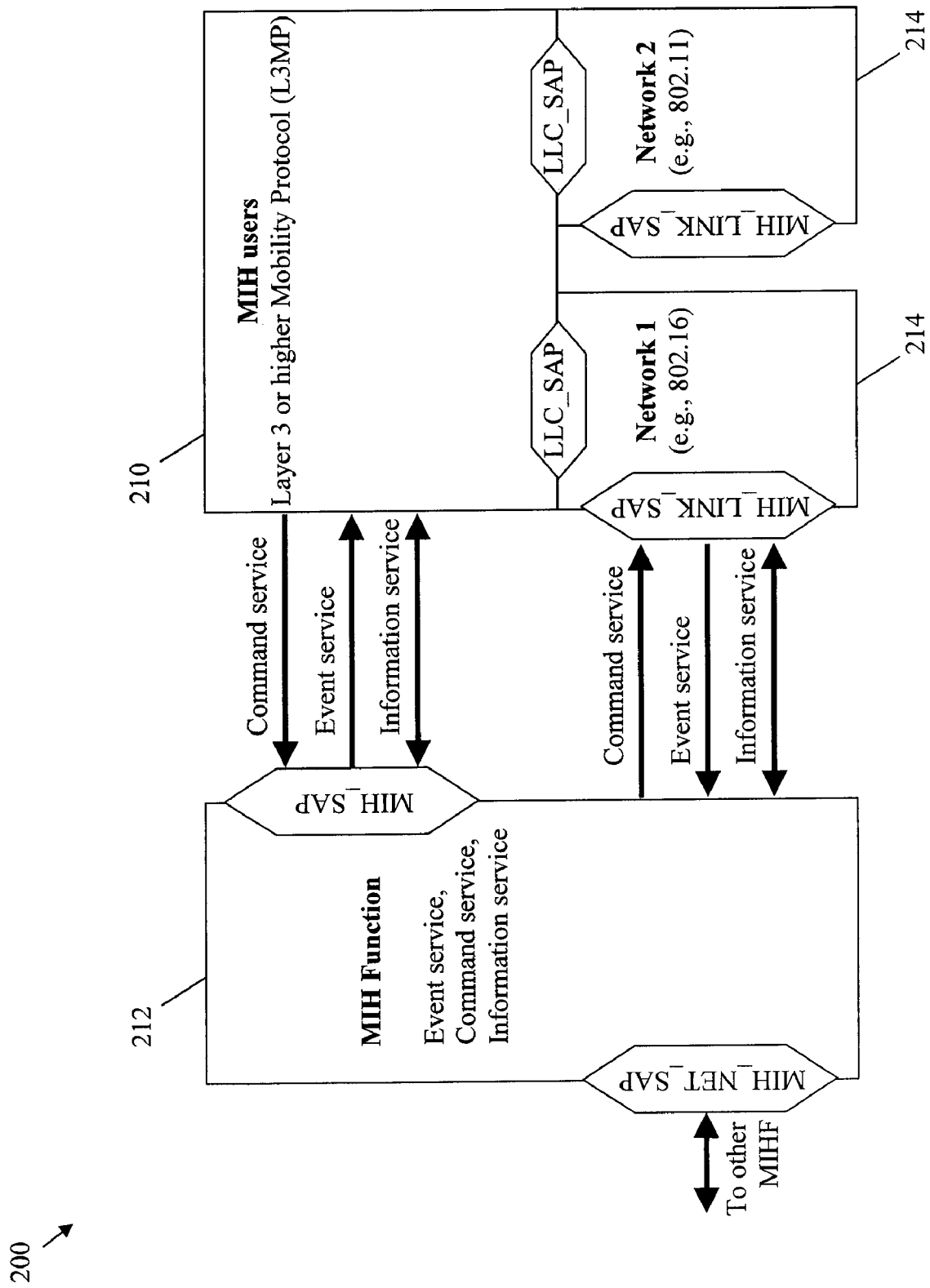
FIG. 2 is a schematic diagram of an embodiment of a MIH architecture.

FIG. 2 illustrates one embodiment of a MIH architecture 200, which may be based on IEEE 802.21, which is incorporated herein by reference. The MIH architecture 200 may be used to support a MN transition between different network technologies, e.g. wireless networks. The MIH architecture 200 may be used between heterogeneous link-layer technologies, which may also be referred to as inter-technology handover. When a state or mode change occurs in a radio interface of the MN, such as entering an active mode or idle mode, a handover may be triggered for the MN. The MN may communicate with a PoS in a network coupled to the MN according to the MIH architecture 200. The MIH architecture 200 may be used to exchange MIH messages for the handover, and hence together with an IP layer mobility protocol such as Mobile IP ensure service continuity for the MN while transitioning between different networks. The MIH architecture 200 may comprise a plurality of layers, including a MIH user 210, a MIH function (MIHF) 212, and a plurality of radio media interfaces 214. The different layers may be located in the MN, the PoS, or both.

The MIH user 210 may be configured to detect a change of state event for at least one radio interface, and in response send a control signal to a lower MIH layer, e.g. the MIHF 212. The MIH user 210 in the MN may manage a radio interface, for example by informing a network coupled to the MN that the radio interface has entered a new operational mode or state. The MIHF 212 may be a standard protocol configured to provide a plurality of services, e.g. handover services, to the MN. The MIHF 212 in the MN and the PoS may be used to exchange a plurality of services including a Command service (CS), an Event service (ES), and an Information service (IS). The MIHF 212 may also exchange the services with other MIH layers. The MN may need to subscribe initially to the MIHF services before using the services. During a handover between a first network and a second network, the MIHF 212 in the PoS and the first PoS in the first network may be used to coordinate with a second PoS in the second network to complete the MN handover. The radio media interfaces 214 in the MN may be configured to manage the radio links with a plurality of corresponding networks. For instance, the radio media interfaces 214 may include an IEEE 802.16 (or WiMAX) interface layer and an IEEE 802.11 (or WiFi) interface layer, which may be used to manage the radio links with a WiMAX network and a WiFi network, respectively.

The different layers of the MIH architecture 200 may communicate with one another using service access points (SAPs). The MIH user 210 and the MIHF 212 may exchange messages using a first SAP (e.g. MIH_SAP). The MIH user 210 and the radio media interfaces 214 may also exchange messages using a plurality of second SAPs (e.g. LLC_SAP). A plurality of third SAPs (e.g. labeled MIH_LINK_SAP or LinkLayerControl_SAP) may be used to exchange messages between the MIHF 212 and the radio media interfaces 214. Further, the MIHF 212 in the MN and the PoS may exchange messages using a fourth SAP (NET_SAP) at the MIHF 212.

In an embodiment, the PoS may act as a serving PoS to manage at least one active radio interface of the MN using the MIH architecture 200. Additionally, the PoS may act as a proxy PoS, e.g. similar to the proxy PoS 134, to manage at least one proxied interface of the MN using the MIH architecture 200. The proxied interface may be a powered off radio interface and/or a radio interface in idle mode. The proxy PoS may use a plurality of MIH messages, which may include some messages different than the messages for managing the active radio interface. For instance, the MIHF 212 may be used to exchange MIH messages between the proxy PoS and a NSE in the MN. When a call arrives for a proxied interface, the proxy PoS may send a wake-up message to the NSE to power on the proxied interface and/or to exit the idle mode. The NSE may then make a decision whether to switch the proxied interface to active and accordingly a handover may be initiated.

The proxy PoS may handle a request for the proxied interface from a proxied PoS or a proxied network, e.g. in response to a call arrival. Accordingly, the NSE may handle state or mode changes for the proxied interface. The NSE and the proxy PoS may establish a remote communication session, e.g. between the MN and the network, at the same layers of the MIH architecture 200. For example, the MIHF 212 may be used to establish the remote communication session between the NSE and the proxy PoS. For each proxied interface, the NSE may maintain an Internet Protocol (IP) session, which may be referred to herein as a NSE session. The NSE session may be used to exchange MIH messages between the NSE and the proxy PoS. As such, the NSE and the proxy PoS may coordinate to ensure that the proxied interface may continue to perform a plurality of functions for maintaining the interface in idle mode. Specifically, the NSE session for each proxied interface may be established via a proxy interface between the MN and the network. The MN and the network may have at least one proxy interface, which may be active or idle but not powered off, to manage another interface of the MN that may be powered off. As such, the proxy PoS may ensure communications between the MN and a plurality of heterogeneous networks. The NSE may use Layer 2 (L2) and/or Layer 3 (L3) resources, which may be allocated to the active proxy interface to establish the NSE sessions. The NSE and the proxy PoS may exchange the MIH messages to manage the proxied interface via the SAP, e.g. NET_SAP, which may also be used by the serving Proxy to manage the proxy interface.

Additionally, the NSE may establish a local communication session between the different layers of the MIH architecture 200. For example, the MIH user 210 and the radio media interfaces 214 may establish the local communication session in the MN. The MIH user 210 and the radio media interfaces 214 may exchange MIH messages to manage the corresponding radio links. The MIH messages between the MIH user 210 and the radio media interfaces 214 may comprise a plurality of command service primitives and event service primitives, which may be exchanged via a service access point, e.g. MIH_LINK_SAP, for each radio interface.

In the case of a LTE radio interface with a LTE network, the proxy PoS may establish a communication session with a MME at the LTE network. The communication session may be established between a high MIH layer in the proxy PoS and a low MIH layer in the MME. As such, a plurality of events associated with the MN on the network level may be reported to the proxy PoS by the high MIH layer and hence sent to the MME by the low MIH layer. For example, the events may include a MN terminated call, an idle mode entry, or an idle mode exit.

Figure 3:
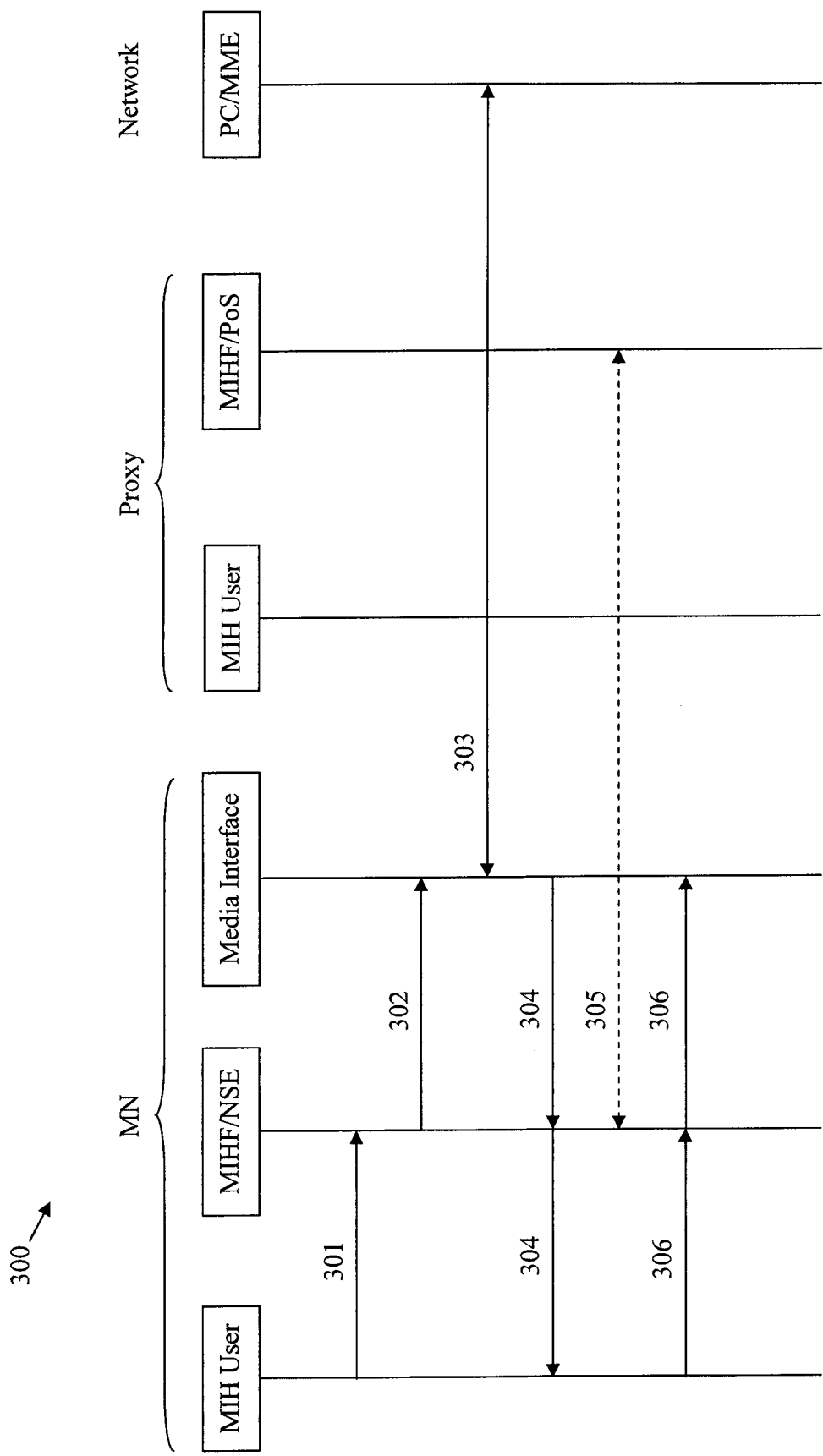
FIG. 3 is a protocol diagram of one embodiment of a proxied idle mode entry method.

FIG. 3 illustrates one embodiment of a proxied idle mode entry method 300, which may be used to switch a radio interface to idle mode and assign a proxy PoS for the interface. The proxied idle mode entry method 300 may be initiated for a MN that comprises at least one active interface and that is aware of a PoS that may handle the MN's handover functions, e.g. a serving PoS. The MN and the PoS may communicate using the MIH architecture 200. The method 300 may begin at step 301, where the MIH user layer in the MN may send a MIH command to the MIHF layer in the MN's NSE (MIHF/NSE) to request entering a radio or media interface in idle mode or powering off the interface. The MIH command may be a CS command (e.g. MIH_Link_Proxied-Mode_Entry).

Next, at step 302, the MIHF/NSE may process the CS command, for instance consult a local policy in the MN, and then send a CS command to the media interface to enter the idle mode. The CS command may be a link command to the media interface to perform idle mode entry with a network. At step 303, the media interface may perform idle mode entry with the network, for instance with a paging controller (PC) for a WiMAX network and/or a MME in an LTE network (PC/MME). In an embodiment, before assigning a proxy PoS to the MN, the PC/MME may be aware of the PoS in charge of handling the MN for handover, e.g. the serving PoS. For example, in a LTE network, the MME may be initially in charge of managing the MN in active or connected state and may be aware of the PoS. Therefore, the PC/MME may also be aware of the PoS when it becomes a proxy PoS for the MN. In another embodiment, e.g. in a WiMAX network, the PC may be initially in charge of managing the media interface of the MN in idle mode, and therefore may not be aware of the proxy PoS when it is assigned to the MN.

At step 304, after the idle mode entry, the media interface may send an ES command (e.g. Link_Go_Idle) to inform the MIHF/NSE about its change of state. Accordingly, the MIHF/NSE may send an ES command (e.g. MIH-Link_Go_Idle) or a confirmation to the MIH user in the MN. In the LTE network, the MME in the network may be initially responsible for the MN mobility management, e.g. in active and idle mode, and therefore may have references to the serving PoS in the active mode. When the media interface enters the idle mode, the MME may send an ES command to the serving PoS, which may become the proxy PoS. However, in the WIMAX network, the PC may not manage the media interface of the MN in active mode, and therefore may not necessarily have references to the PoS. In this case, the PC may be aware of the PoS in the next step 305.

At step 305, the MIHF/NSE may send a CS command (e.g. MIH_MN_Start_NSE_Session) to the PoS to start a NSE session with the NSE and to register for events that may occur in the network, such as a call arrival. Thus, the PoS may be informed of the interface state change in the MN. The PoS may then inform the MIH user in the network about the interface state change. At this point, the PoS may become a proxy PoS for the media interface. The PoS may use a CS command (e.g. Link_Event_Subscribe), e.g. as defined in IEEE 802.21, to register the events that occur in the network. In an embodiment, one of the unused bits (from bit 8 to bit 32) in the parameter RequestedLinkEventList, which has a data type LINK_EVENT_LIST, may be used to indicate a call arrival event. In the WiMAX network, where the PC may not have the PoS references, an interface may be established between the PC and the PoS if its does not exist previously. The interface with the PC in the network may enable the PoS to act as a proxy for the media interface on behalf of the network. In some embodiments, the step 305 may be excluded from the method 300 to save energy. As such, in the WiMAX network, the PoS may be informed by the PC/MME of the successful completion of the idle mode entry, and hence the PoS may start proxying the media interface.

At step 306, the MIH user may send a CS command (e.g. MIH_Link_PowerOff_state) to the MIHF to power off the media interface. Upon receiving the command, the MIHF may send a CS link command (e.g. Link_PowerOff_State) to the SAP of the media interface, e.g. Link_SAP. Before powering off the media interface, each of the sub-layers (e.g. the media access (MAC) layers) of the interface may have associated configurations. When powering off the media interface, information about the configurations may be stored and maintained by the NSE. Subsequently, during the interface wake up or upon the interface exiting the idle mode, the sub-layers of the media interface may retrieve the configuration information from the NSE.

Figure 4:
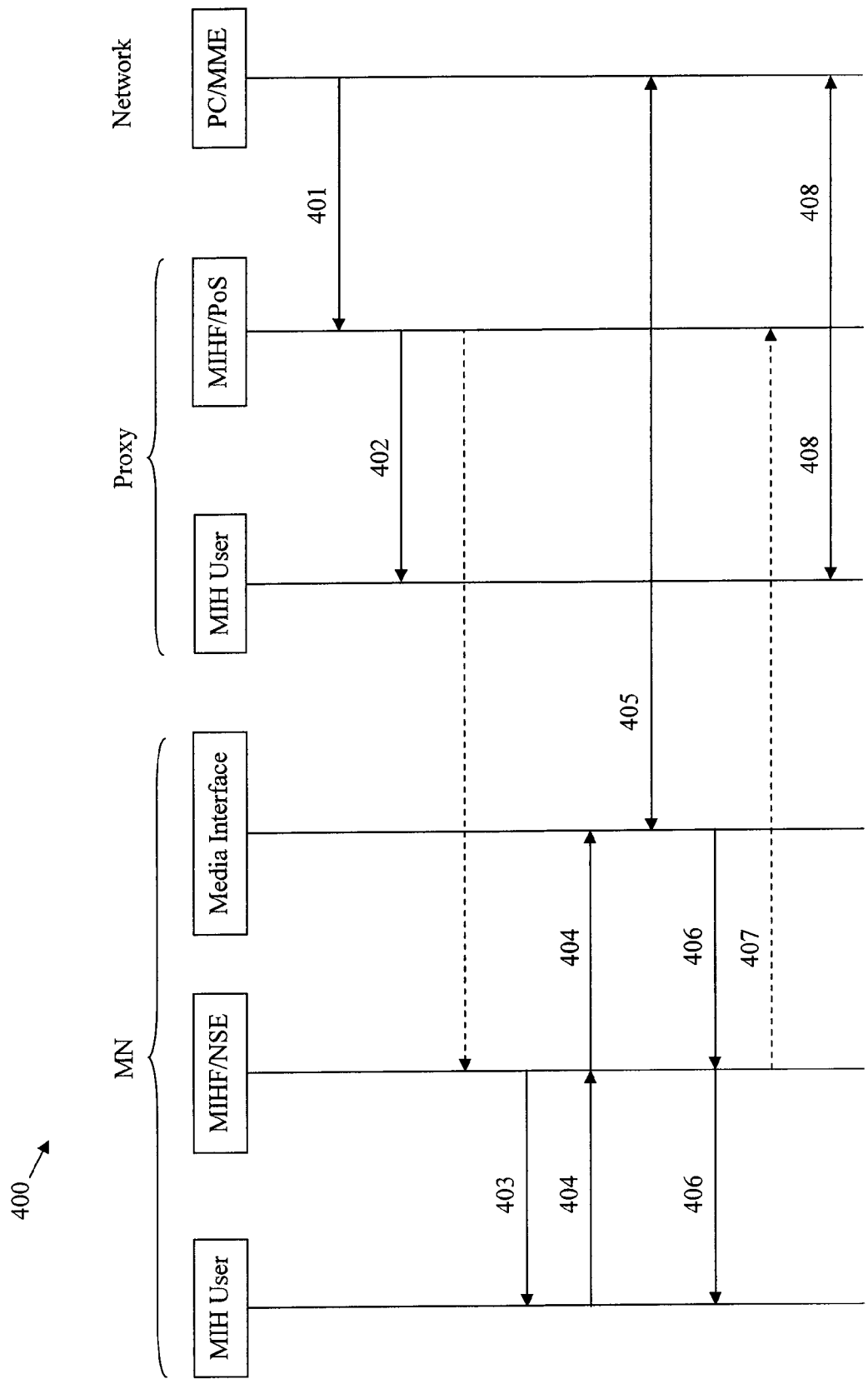
FIG. 4 is a protocol diagram of one embodiment of a proxied interface wake up method.

FIG. 4 illustrates one embodiment of a proxied interface wake up method 400, which may be used to wake up a powered off interface in a MN. The MN may have a NSE session with a proxy PoS for managing the powered off interface and may comprise at least one active interface, which may be used to maintain the NSE session. The proxied interface wake up method 400 may be used to wake up the proxied interface when a call arrives in a network for the interface where paging MN upon call arrival happens, such as MME or PC. The method 400 may begin at step 401, where a PC/MME in the network may receive a notification about a call for the proxied interface in the MN. Hence, the PC/MME may start a paging procedure with a PoS interface, e.g. with the proxy PoS. The PoS interface may intercept a paging message from the PC/MME and send an ES event (e.g. Link_Call_WakeUp) to the MIHF/PoS in the proxy PoS to inform it about the arrival of a call.

Next, at step 402, the MIHF/PoS may send an ES event (e.g. MIH_Link_Call_WakeUp) to the MIH user in the PoS to update the state of the interface. The MIHF/PoS may also send an ES event (e.g. MIH_Net_Call_WakeUp) to the MIHF/NSE in the MN to inform the MN that the system has a call to the powered off interface and therefore the NSE may be required to wake up the interface. At step 403, when the MIHF/NSE receives the ES message (e.g. MIH_Net_Call_WakeUp) from the MIHF/PoS to wake up the interface, the MIHF/NSE may forward the message to the MIH user, which may then update the state of the interface.

At step 404, the MIH user may process the received ES message and send a CS command (e.g. MIH_Link_PowerOn_WakeUp) to the MIHF/NSE to wake up the powered off interface. The MIHF/NSE may then send a CS message (e.g. Link_PowerOn_WakeUp) to the media interface, e.g. via Link_SAP, to power on the interface so it may be ready to accept the call. At step 405, upon receiving the CS message, the media interface may power on, retrieve the configuration information about each sub-layer, e.g. MAC layer, from the PC/MME, and configure the sub-layers accordingly. The sub-layers may have the same configuration that they previously had before powering off or entering the idle mode. As such, the interface may be ready to initiate an idle mode exit procedure with its network.

At step 406, after a successful idle mode exit procedure, the media interface may send an ES message or Link event (e.g. Link_Up) to the MIHF/NSE to inform it that the interface is no longer in idle state and is instead in active state. The MIHF/NSE may then send an ES message (e.g. MIH_Link_Up) to the MIH user to update the state of the interface. The ES messages or events may be based on IEEE 802.21. At step 407, the MIHF/NSE may send a CS message (e.g. MIH_MN_End NSE_Session) to the MIHF/PoS to end the NSE session with the MN. Upon receiving the message, the PoS may stop proxying the interface. At step 408, the MIHF/PoS may also send a CS command or Link command (e.g. Link_Event_Unsubscribe) to the PC/MME in the network and notify the MIH user in the PoS about the interface state change.

Figure 5:
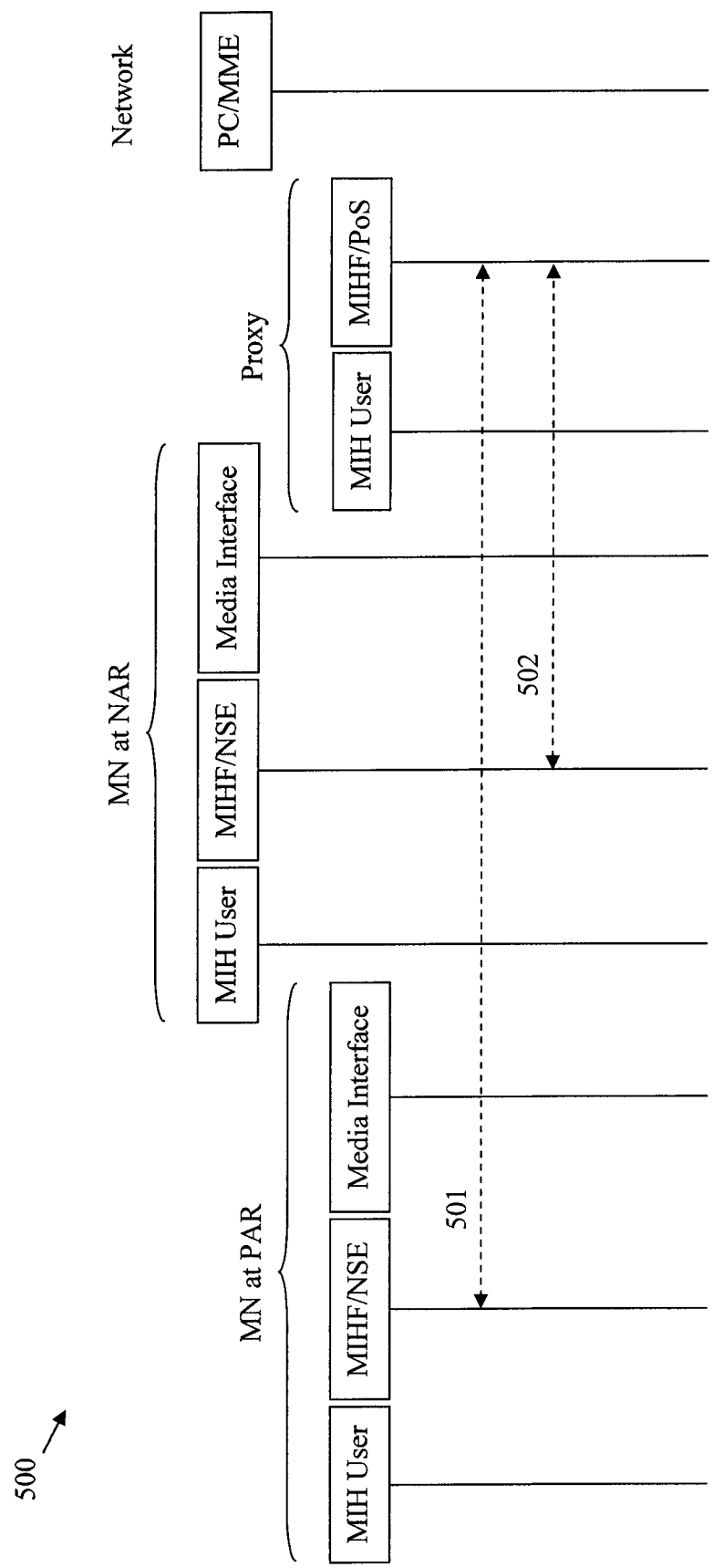
FIG. 5 is a protocol diagram of one embodiment of a proxy session mobility handling method.

FIG. 5 illustrates one embodiment of a proxy session mobility handling method 500, which may be used to track the mobility of a proxied interface. In some systems, the mobility of a MN's interface may be tracked by monitoring the geographical location of the MN, e.g. at an information server or a proxy PoS, and determining if the MN has changed its paging or tracking area in the proxied network. Thus, if the MN has changed its paging or tracking area, proper location update and PC/MME relocation signaling may be carried out to determine the new proxy PoS. However, monitoring the geographical location of the MN may require Global Positioning System (GPS) capability for the MN. Additionally, it may be complicated to map the location data of the MN into accurate paging or tracking area in the proxied network. Instead, the method 500 may be used to track the mobility of the proxied interface based on the mobility of the active interface.

Due to user mobility, the active interface between the MN and the proxy PoS may change connection with different base stations and the IP address associated with the active interface may change. Layer 2 mobility of the active interface may not affect the proxy PoS since the proxy PoS may have an IP level session established with the NSE of the MN. However, the IP address changes may need to be signaled to the proxy PoS. When an IP address of the active interface changes, the NSE may go through a session reestablishment procedure with the proxy PoS, as described below. The session reestablishment procedure may ensure that the proxy PoS is up-to-date with the latest IP address of the NSE. Thus, when a call arrives for the proxied interface, the proxy PoS may wake up the powered off interface, e.g. using the proxied interface wake up method 400, and the MN may receive the call on time.

The method 500 may begin at step 501, where the MIHF/NSE in the MN may send a CS message (e.g. MIH_M-N_End_NSE_Session) to the MIHF/PoS in the proxy PoS to end the NSE session with the NSE, which may have an outdated or old IP address before changing location. For instance, the MN may have been communicating with a previously assigned access router (or PAR). Upon receiving the message, the PoS may stop proxying the powered off interface via the NSE at the PAR. At step 502, after moving the MN to a new access router (NAR) and assigning a new IP address, the MIHF/NSE may send a CS command (e.g. MIH_MN_Start_NSE_Session) to the PoS to start a new NSE session with the NSE at the NAR.

In some networks that support idle mode management, the MNs comprising proxied interfaces in idle mode may be required to perform a location update (LU) procedure or LU/tracking area update (TAU) procedure, e.g. periodically. As such, the network entities (e.g. PC and/or MME) may be aware of the presence of their managed MNs. For instance, in a third generation (3G) LTE system, when an interface is in idle state, the location of the user equipment (UE) comprising the interface maybe known by the MME at a granularity of a tracking area (TA), which may comprise a plurality of evolved NodeBs (eNBs). The MME may manage at least one TA and maintain a list of TAs that may be sent to the UEs in the network. As long as the UEs remain located in the TAs, no TA change procedures are needed but periodic LU is still needed.

However, in a WiMAX network, there may be several LU evaluation conditions, which may trigger the MN comprising an interface in idle mode to implement a LU procedure. Such LU evaluation conditions may comprise a "Paging Group Update" condition, where the MN may detect a change in a paging group (PG), which may be determined by a set of base stations. Another condition may be a "Timer Update" condition, where the MN may periodically perform the LU procedure prior to the expiration of an "Idle Mode Timer," which may define a time interval between two consecutive LUs. Performing the LU procedure may be inconvenient since an interface in idle mode may need to wake up periodically to perform a periodic LU, which may cause the MN to consume more energy. Alternatively, to overcome the need to perform the LU repeatedly or periodically, the proxied interface may remain in idle mode or powered off and instead the proxy PoS may perform a periodic LU on behalf of the interface.

Figure 6:
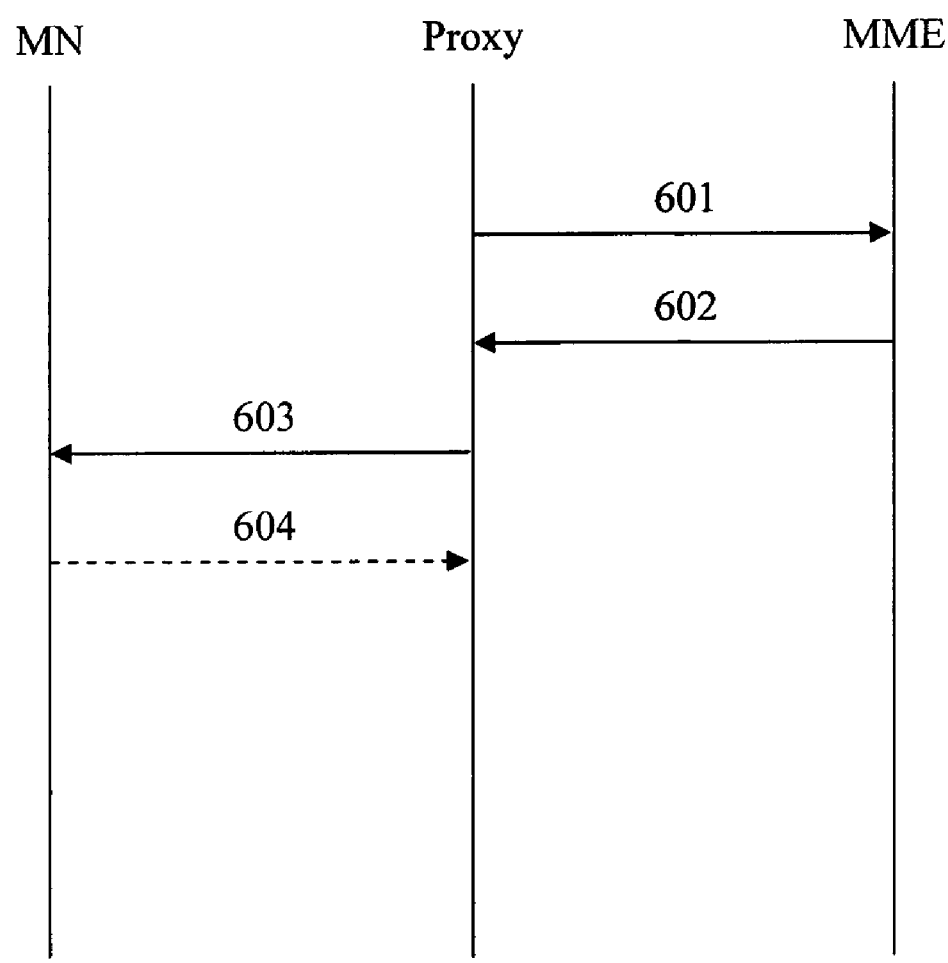
FIG. 6 is a protocol diagram of one embodiment of a proxy location update method.

FIG. 6 illustrates one embodiment of a proxy location update method 600, which may be used to update the location of a MN comprising a proxied interface, e.g. in a 3GPP LTE network. The method 600 may be established based on IEEE 802.21. The method 600 may begin at step 601, where the proxy PoS of the MN's interface may send a TAU Request message to the MME in the network. The TAU Request message may comprise a new command service link primitive (e.g. Link_Location_Update), which may be used by the proxy PoS to perform a LU procedure with a MME entity. At step 602, in response to the TAU request, the MME may send a TAU Accept message to the proxy PoS to ask the MN to update some of its parameters, such as a globally unique temporary identifier (GUTI), and a tracking area identity (TAI). At step 603, upon receiving the TAU Accept message, the proxy PoS may update locally the parameters for the proxied interface. The proxy PoS may then send to the MN a command service message using the NSE session. The message may be a MIH CS message (e.g. Net_MIH_Location_Update) and may comprise the updated parameters. The MN may use the updated values from the proxy PoS to update its local parameters. At step 604, the MN may send its updated parameter values to the PoS to synchronize with the network.

Figure 7:
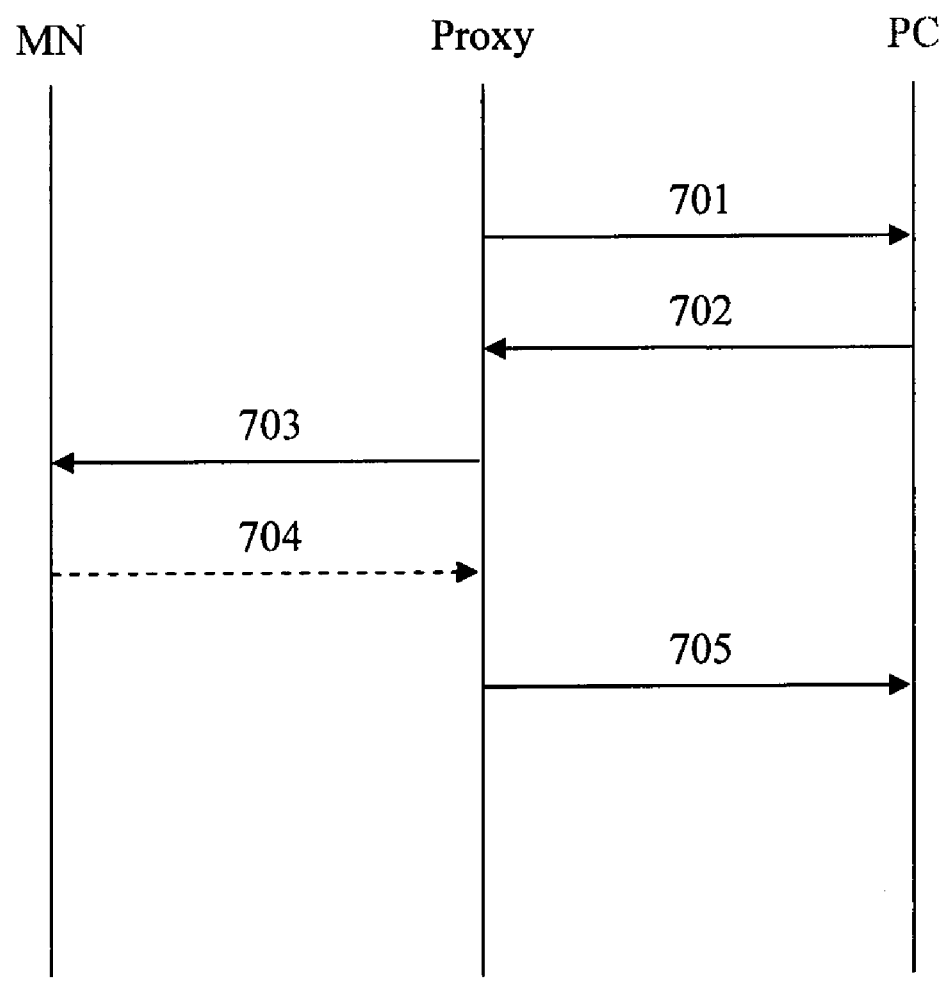
FIG. 7 is a protocol diagram of another embodiment of a proxy location update method.

FIG. 7 illustrates one embodiment of another proxy location update method 700, which may be used to update the location of a MN comprising a proxied interface, e.g. in a WiMAX network. Similar to the method 600, the method 700 may be based on IEEE 802.21. The method 700 may begin at step 701, where the proxy PoS of the MN's interface may send a LU_Request (LU_Req) message to the PC that has the location of the MN, called Anchor PC. The LU_Req message may comprise a new command service link primitive (e.g. Link_Location_Update), which may be used by the proxy PoS to perform a LU procedure with a PC. At step 702, in response to the LU_Req, the PC may send a LA Response (LU_Rsp) message to the proxy PoS to ask the MN to update some of its parameters. At step 703, upon receiving the LU_Rsp, the proxy PoS may update locally the parameters for the proxied interface. The proxy PoS may then send to the MN a command service message using the NSE session. The message may be a MIH CS message (e.g. Net_MIH_Location_Update) and may comprise the updated parameters. The MN may use the updated values from the proxy PoS to update its local parameters. At step 704, the MN may send its updated parameter values to the PoS to synchronize with the network. At step 705, the PoS may send a LU Confirmation (LU_Cnf) message to the PC to confirm the parameters update at the MN.

In an embodiment, when the MN's interface enters idle mode, and is hence proxied by the PoS, e.g. during powered off state, the proxy PoS may start performing any scheduled LU procedure for the interface on behalf of the MN. During the proxying period of the interface, the network may assume that the MN is located in the same paging/tracking area, where the interface may have performed the idle mode entry and was proxied. The network may also consider the MN to be located in this same area when the MN moves to a new area that may or may not be managed by the PC/MME of the network. The MN may move between different areas without being aware of its actual location and without reporting the actual location to the proxy PoS and hence the PC/MME. Thus, during the proxying period of the interface, the system may assume that the MN may not change location. However, using the method 600 or the method 700, the system may remain capable of waking up the powered off interface during that period using standard paging procedures.

Table 1 shows a list of a plurality of CS primitives, which may be used to exchange information between the different MIH layers and support the different communications scenarios for proxying the radio interface. For instance, the CS primitives may be used in the methods described above and may be added to extend IEEE 802.21. The CS primitives may comprise MIH CS messages and Link CS messages. Table 1 also comprises a list of the steps described above, where each of the CS primitives may be exchanged.

TABLE 1

| Name | Type | Usage |
| --- | --- | --- |
| MIH_Link_ProxiedMode_Entry | MIH CS | step 301 of method 300 |
| MIH_Link_Go_Idle | MIH CS | step 304 of method 300 |
| MIH_MN_Start_NSE_Session | MIH CS | step 305 of method 300 |
| MIH_MN_End_NSE_Session | MIH CS | step 407 of method 400 |
| MIH_Link_PowerOff_State | MIH CS | step 306 of method 300 |
| MIH_Link_PowerOn_WakeUp | MIH CS | step 404 of method 400 |
| Link_ProxiedMode_Entry | Link CS | step 302 of method 300 |
| Link_PowerOff_State | Link CS | step 306 of method 300 |
| Link_PowerOn_WakeUp | Link CS | step 404 of method 400 |
| Net_MIH_Location_Update | MIH CS | LU procedure in method 600 and method 700 |

Table 2 shows a list of a plurality of ES primitives, which may be used to exchange information between the different MIH layers and support the different communications scenarios for proxying the radio interface. The ES primitives may be used in the methods described above and may be added to extend IEEE 802.21. The ES primitives may comprise MIH ES messages and Link ES messages. Table 2 also comprises a list of the steps described above, where each of the ES primitives may be exchanged.

TABLE 2

| Name | Type | Usage |
| --- | --- | --- |
| MIH_Link_Go_Idle | MIH ES | step 304 of method 300 |
| MIH_Net_Call_WakeUp | MIH ES | step 405 of method 400 |
| MIH_Link_Call_WakeUp | MIH ES | step 405 of method 400 |
| Link_Call_WakeUp | MIH ES | step 401 of method 400 |
| Link_Go_Idle | Link ES | step 304 of method 300 |

Figure 8:
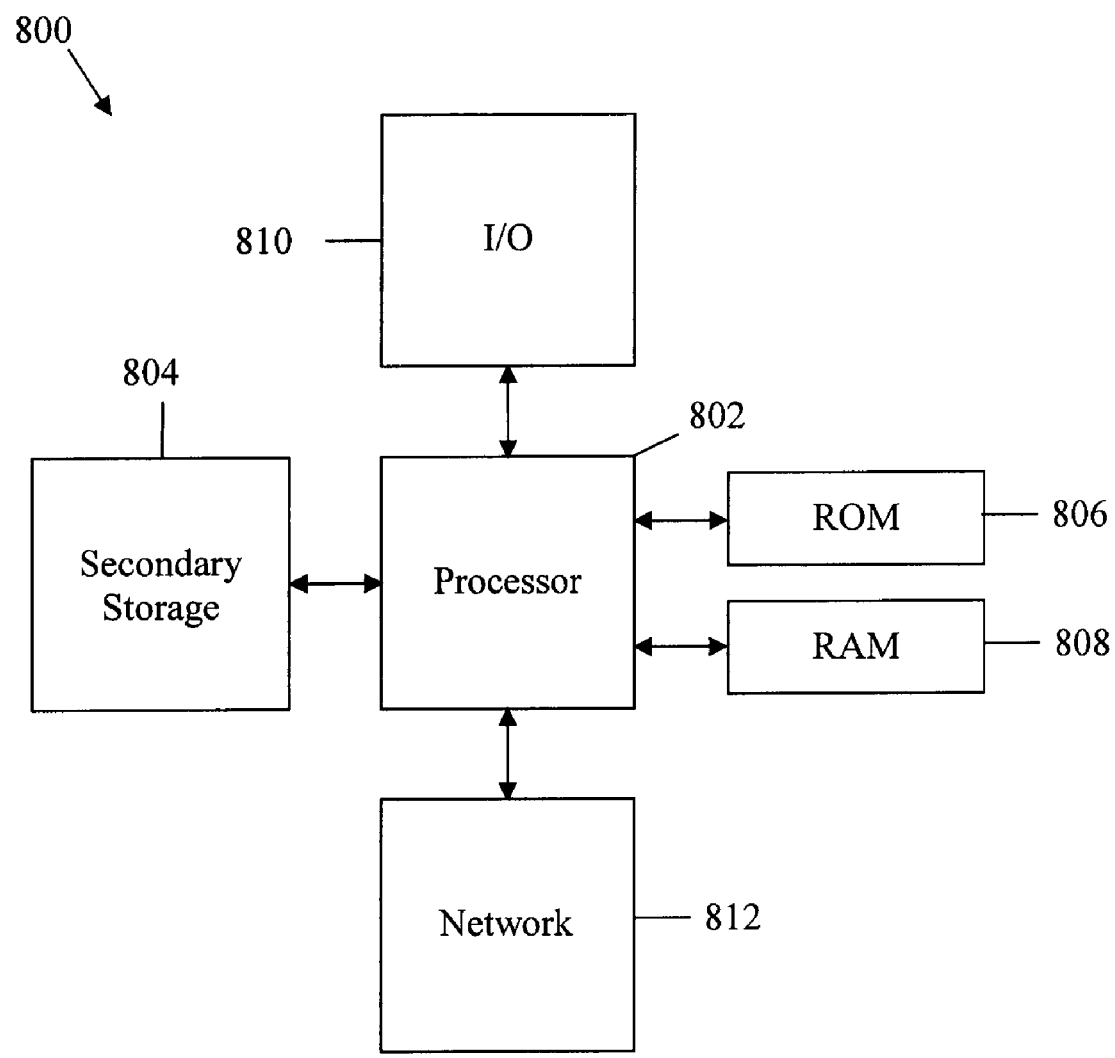
FIG. 8 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or tape drives and is used for non-volatile storage of data and as an over-flow data storage device if RAM 808 is not large enough to hold all working data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a mobile node (MN) comprising a first radio interface for communicating with a first network and at least one second radio interface for communicating with a second network, wherein the MN is configured to communicate with a point of service (PoS) in a first network via the first radio interface through a first point of attachment (PoA) in the first network, wherein the first interface is an active interface and the second interface is a powered off interface, wherein the second interface is activated by the PoS through the PoA on behalf of the second network via a paging signal, and wherein the second network comprises a second PoS that communicates with the PoS to manage the second interface.

2. The apparatus of claim 1, wherein the network is a Long Term Evolution (LTE) network, and the second PoS is a Mobility Management Entity (MME).

3. The apparatus of claim 1, wherein the network is based on Institute of Electrical and Electronics Engineers (IEEE) 802.16, and wherein the second PoS is a paging controller (PC) that keeps the paging group currently associated with the interface.

4. The apparatus of claim 1, wherein the second network is based on Institute of Electrical and Electronics Engineers (IEEE) 802.11.

5. The apparatus of claim 1, wherein the first interface comprises an Institute of Electrical and Electronics Engineers (IEEE) 802.11 interface, and wherein the second interface comprises an IEEE 802.16 interface or a Third Generation Partnership Project (3GPP) interface.

6. The apparatus of claim 1, wherein the MN does not act as a network connection point for a user device.

7. An apparatus comprising:
a mobile node (MN) comprising a first radio interface for communicating with a first network and at least one second radio interface for communicating with a second network, wherein the first network comprises a point of service (PoS) that is configured to communicate with the MN via the first radio interface through a first point of attachment (PoA) in the first network, wherein the first interface is an active interface and the second interface is a powered off interface, wherein the PoS manages the second interface through the PoA on behalf of the second network, wherein the second network comprises a second PoS that communicates with the PoS to manage the second interface, and wherein the MN comprises a third radio interface, wherein the first interface comprises an Institute of Electrical and Electronics Engineers (IEEE) 802.11 interface, wherein the second interface comprises an IEEE 802.16 interface, and wherein the third interface comprises a Third Generation Partnership Project (3GPP) interface.

8. A method comprising:
proxying an interface in a powered off mode for a mobile node (MN) on behalf of a network using a Media Independent Handover (MIH) protocol between the MN, the network, and a proxy entity, wherein the MIH protocol is based on Institute of Electrical and Electronics Engineers (IEEE) 802.21, wherein the MIH protocol comprises a plurality of MIH layers in the MN and the proxy entity, and wherein the MIH layers comprise a MIH user, a MIH function (MIHF), and a media interface, wherein behaving as a proxy for the first interface comprises exchanging a first plurality of messages with the MIH user and the MIHF and a second plurality of messages with the media interface, wherein the first plurality of messages comprise a plurality of MIH Command Service (CS) messages and MIH Event Service (ES) messages that are exchanged with the MIH user and the MIHF.

9. The method of claim 8, wherein the MIH CS messages and MIH ES messages comprise MIH_Link_ProxiedMode_Entry, MIH_Link_Go_Idle, MIH_MN_Start_NS-E_Session, MIH_MN_End_NSE_Session, MIH_Link_PowerOff_State, MIH_Link_PowerOn_WakeUp, Net_MIH_Location_Update, MIH_Net_Call_WakeUp, MIH_Link_Call_WakeUp, and Link_Call_WakeUp, and wherein the second plurality of messages comprise Link_ProxiedMode_Entry, Link_PowerOff_State, Link_PowerOn_WakeUp, and Link_Go_Idle.

10. The method of claim 9, wherein MIH_Link_ProxiedMode_Entry, MIH_Link_Go_Idle, MIH_MN_Start_NS-E_Session, MIH_Link_PowerOff_State, Link_ProxiedMode_Entry, Link_PowerOff_State, and Link_Go_Idle are exchanged to power off the interface.

11. The method of claim 9, wherein MIH_MN_End_NS-E_Session, MIH_Link_PowerOn_WakeUp, MIH_Net_Call_WakeUp, MIH_Link_Call_WakeUp, Link_PowerOn_WakeUp, and Link_Call_WakeUp are exchanged to wake up the interface.

12. The method of claim 9, wherein Net_MIH_Location_Update is exchanged to update a location of the interface.

13. The method of claim 8, wherein proxying the interface further comprises indicating a call arrival event using a Link_Event_Subscribe CS command for registering network events, wherein the Link_Event_Subscribe CS command comprises a RequestedLinkEventList parameter that has a data type LINK_EVENT_LIST, and wherein one of the unused bits from bit eight to bit 32 in the RequestedLinkEventList parameter is used to indicate the call arrival event.

14. The method of claim 8, wherein the MN uses the first interface to communicate via a first communication protocol and the second interface to communicate via a second communication protocol.

15. The method of claim 14, wherein the first communication protocol is different than the second communication protocol.

16. The method of claim 14, wherein the first communication protocol is in accordance with one of Institute of Electrical and Electronics Engineers (IEEE) 802.11 or IEEE 802.16, and wherein the second communication protocol is in accordance with the other one of the IEEE 802.11 or IEEE 802.16.

17. A mobile node (MN) for conserving power during paging periods, the MN comprising:
a first wireless interface for communicating with a first network based on a first wireless communication protocol;
a second wireless interface for communicating with a second network based on a second wireless communication protocol; and
a processor coupled to the first wireless interface and the second wireless interface and configured to:
receive a paging signal corresponding to the second radio interface on the first wireless interface, wherein the second radio interface is powered off when the paging signal is received; and
activate the second radio interface if the paging signal indicates that the second network is prepared to communicate data to the second interface according to the second communication protocol, wherein the first network comprises a first point of service (POS) configured to manage the first interface via a point of attachment (POA) in the first network, and wherein the first POS is configured to manage the second interface via the POA and on behalf of a second POS in the second network.

18. The MN of claim 17, wherein the second wireless communication protocol is different than the first wireless communication protocol.

19. A method for conserving power during paging periods, the method comprising:

periodically sending a paging signal from a first Point of Service (PoS) in a first network, on behalf of a second PoS in a second network, through a point of attachment (PoA) in the first network over a first interface of a mobile node (MN) while a second interface of the MN, associated with the second PoS, is powered down, wherein the MN communicates via the first interface according to a first wireless communication protocol and via the second interface according to a second wireless communication protocol; and using the paging signal to instruct the MN to power-up the second interface upon determining that a network component is prepared to communicate data to the MN using the second wireless communication protocol.

20. A mobile node (MN) for conserving power during paging periods, the MN comprising:

a first wireless interface for communicating with a first network based on a first wireless communication protocol;

a second wireless interface for communicating with a second network based on a second wireless communication protocol; and a processor coupled to the first wireless interface and the second wireless interface and configured to:

receive a paging signal corresponding to the second radio interface on the first wireless interface, wherein the second radio interface is powered off when the paging signal is received; and activate the second radio interface if the paging signal indicates that the second network is prepared to communicate data to the second interface according to the second communication protocol, wherein the first network comprises a first point of service (POS) configured to manage the first interface via a point of attachment (POA) in the first network, wherein the first POS is configured to manage the second interface via the POA and on behalf of a second POS in the second network, wherein the first POS is configured to provide services to the MN, handle attachment of the MN to the first network, authenticate the MN, and set up a radio bearer for the first network, and wherein the second POS is configured to provide services to the MN, handle attachment of the MN to the second network, authenticate the MN, and set up a radio bearer for the second network.

* * * * *